U. Rice,
Flour Sifter,
No. 50,734. Patented Oct. 31, 1865.
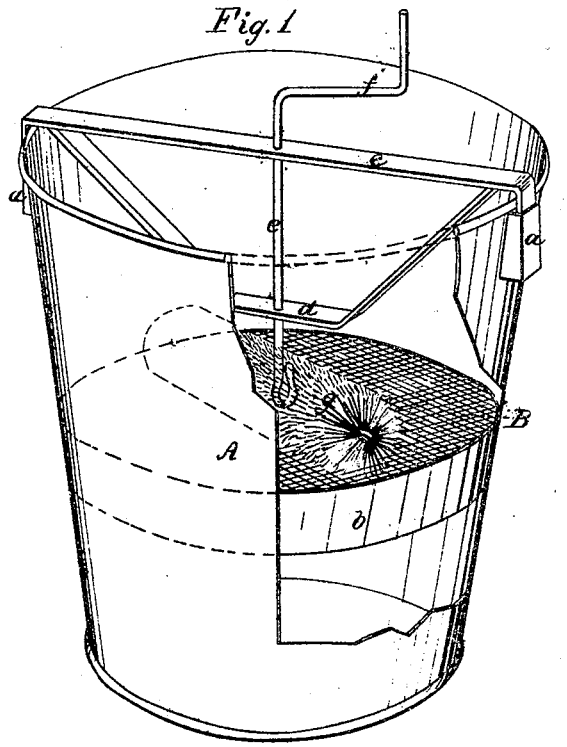
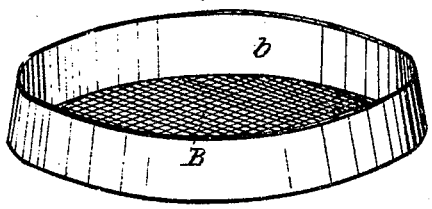
Witnesses
Inventor

UNITED STATES PATENT OFFICE.

URIAH RICE, OF CINCINNATI, OHIO.

FLOUR-SIFTER.

Specification forming part of Letters Patent No. 50,734, dated October 31, 1865.

*To all whom it may concern:*

Be it known that I, URIAH RICE, of Cincinnati, Hamilton county, Ohio, have invented a new and useful Improvement in Flour-Sifters, of which the following is a full and clear description thereof, reference being had to the accompanying drawings, and letters of reference marked thereon.

My invention relates to a flour-sifter so constructed as to facilitate the operation in sifting meal.

Figure 1 is a perspective view of the sifter, with a part of the receiving-tank removed, exposing the construction and arrangement of the interior parts. Fig. 2 is a perspective view of the sieve detached from the flour-sifter.

A is the receiving-tank, of cylindrical form, tapering downward. Between the top and bottom edges, at a convenient distance from either, is a sieve, B, which is secured to the larger edge of hoop $b$.

Upon the exterior of the tank A, and diametrically opposite each other, are receiving-clamps $a$, secured in position to receive the ends of bracing-bar $c$. To bracing-bar $c$ depends the hanger $d$, which assists in steadying the axle or shaft $e$, which passes vertically through bars $c$ and $d$. Shaft $e$ has externally the crank $f$, and at its lower extremity is secured the circular brush $g$.

The flour or meal which it is designed to sift is placed in the receiving-tank and falls upon sieve B. By giving a rotary motion to shaft $e$ by means of crank $f$ the brush $g$ revolves, pushing and dividing the masses of meal, allowing the finer parts readily to fall below in a vessel placed to receive it.

When it is not desirable to use the tank A, or when only small quantities of flour or meal are to be sifted, the sieve B is removed and inverted, as shown in Fig. 2, when it may be used as the ordinary domestic sieve. The shaft $e$ is of sufficient length to permit the upward motion when too much flour is beneath the brush $g$.

Having described my improved flour-sifter and the mode of operating it, I make the following claim:

The combination of the sieve B, receiving-tank A, receiving-clamps $a$, bracing-bar $c$, shaft $e$, and brush $g$, all constructed as above described, and for the purpose set forth.

URIAH RICE.

Attest:
WM. DOEGEN,
C. L. FISHER.